US005240539A

United States Patent [19]

Gunzelman et al.

[11] Patent Number: 5,240,539

[45] Date of Patent: Aug. 31, 1993

[54] PROCESS FOR MAKING THREE-DIMENSIONAL SIGNAGE

[75] Inventors: Deborah M. Gunzelman, Greenwich; Wayne C. Hoffman, Bethel; James L. Bernstein, Westport, all of Conn.

[73] Assignee: New Hermes Incorporated, Norwalk, Conn.

[21] Appl. No.: 838,388

[22] Filed: Feb. 19, 1992

[51] Int. Cl.$^5$ .................... B32B 31/00

[52] U.S. Cl. .................... 156/248; 156/247; 156/267; 156/263; 156/268; 156/257

[58] Field of Search .................... 156/248, 247, 252, 257, 156/267, 268, 263

[56] References Cited

U.S. PATENT DOCUMENTS

| | | | |
|---|---|---|---|
| 1,428,334 | 9/1922 | Knauber | 156/268 X |
| 1,505,366 | 8/1924 | Hartog | 101/128.4 |
| 1,573,295 | 2/1926 | Bourgeois | 156/248 |
| 1,594,607 | 8/1926 | Engelmann | 409/88 |
| 2,016,092 | 10/1935 | Kavanaugh | 101/128.4 |
| 2,156,696 | 5/1939 | Knox | 101/128.21 |
| 2,289,717 | 7/1942 | Montogomery | 434/113 |
| 2,495,519 | 1/1950 | Gregson et al. | 409/86 |
| 2,591,779 | 4/1952 | Buck | 154/95 |
| 2,976,204 | 3/1961 | Young | 156/247 X |
| 3,055,294 | 9/1963 | Amyx | 101/128.4 |
| 3,119,919 | 1/1964 | Pratt | 409/86 |
| 3,226,227 | 12/1965 | Wolff | 101/128.4 |
| 3,287,192 | 11/1966 | Poulenz | 156/3 |
| 3,294,611 | 12/1966 | Vomela | 156/249 X |
| 3,297,508 | 1/1967 | Jahp | 156/249 |
| 3,301,287 | 1/1967 | Edwards | 434/113 |
| 3,307,274 | 3/1967 | Glasser | 434/113 |
| 3,363,339 | 1/1968 | Place | 434/113 |
| 3,506,528 | 4/1970 | Dean | 428/156 |
| 3,539,424 | 11/1970 | Tasulick | 156/247 X |
| 3,578,538 | 5/1971 | Prosser | 156/268 X |
| 3,628,417 | 12/1971 | Graboyes | 409/84 |
| 3,629,034 | 12/1971 | Kuroda | 156/268 X |
| 3,667,759 | 6/1972 | Barr | 409/84 |
| 3,687,750 | 8/1972 | Jamieson | 428/156 |
| 3,688,028 | 6/1972 | Short | 101/128.4 |
| 3,781,182 | 12/1973 | Friedman | 409/130 |
| 3,861,976 | 1/1975 | Gayner | 156/248 X |
| 3,900,645 | 9/1975 | Morgan | 156/247 X |
| 3,975,938 | 8/1976 | Stockman | 409/84 |
| 3,986,283 | 10/1976 | Pelaez | 428/41 |
| 4,023,971 | 5/1977 | Vested | 101/128.4 |
| 4,025,338 | 5/1977 | Miyatuka et al. | 409/84 |
| 4,126,500 | 11/1978 | Palanos | 428/67 |
| 4,139,409 | 2/1979 | Macken | 40/615 |
| 4,198,774 | 4/1980 | Roberts et al. | 40/587 |

(List continued on next page.)

*Primary Examiner*—David A. Simmons
*Assistant Examiner*—Charles Rainwater
*Attorney, Agent, or Firm*—Seidel, Gonda, Lavorgna & Monaco

[57] ABSTRACT

This invention provides processes for making three-dimensional signage. In one embodiment, a process is provided for making raised graphic signage. In this embodiment, a profile material is adhered to a substrate materials with an adhesive which: (a) bonds firmly enough to hold the profile and substrate materials together during the process, (b) permits the profile and substrate material to be separated after the process is completed, and (c) cures to form a more permanent bond after the profile and substrate materials have been separated. Then, an outline of a desired graphic is cut completely through the profile material. That portion of the profile material which does not constitute the outlined graphic is then separated form the substrate material, before the adhesive forms a permanent bond. In another embodiment, a process is provided for making recessed graphic signage. This embodiment is similar to the former, except that, after an outline of a desired graphic is cut completely through the profile material, that portion of the profile material which constitutes the outlined graphic is separated form the substrate material, before the adhesive forms a permanent bond. When practicing either embodiment of this invention, the alignment and registration of the letters, numbers and graphics are maintained.

14 Claims, 6 Drawing Sheets

U.S. PATENT DOCUMENTS 4,368,587 1/1983 Childs ................................ 101/150
4,378,215 3/1982 Sparks ................................ 434/113
4,404,764 9/1983 Wills et al. ......................... 40/124.1
4,455,113 6/1984 Liebman ............................ 40/124.1
4,473,424 9/1984 Sorko-Ram ........................ 40/124.1
4,512,839 4/1985 Gerber ........................... 156/268 X
4,533,286 8/1985 Kishi et al. ........................... 409/84
4,624,609 11/1987 Pickett ................................ 409/96
4,702,786 10/1987 Tallman ............................ 156/154
4,878,844 12/1989 Gasper et al. ....................... 434/113
4,894,110 1/1990 Lass et al. .......................... 428/916
4,961,804 10/1990 Aurichio ............................ 156/248
5,003,153 3/1991 Kondo ................................ 428/916
5,026,584 6/1991 Logan ............................ 428/914 X
5,033,964 7/1991 Phelps ................................ 434/113
5,112,423 5/1992 Liebe ............................. 156/247 X
5,143,576 9/1992 Logan ............................ 156/250 X

PROCESS FOR MAKING THREE-DIMENSIONAL SIGNAGE

FIELD OF THE INVENTION

This invention pertains to processes for making three-dimensional signage. In particular, the processes can be used to produce three-dimensional letters, numerals, symbols and/or graphics on a work piece.

BACKGROUND OF THE INVENTION

Processes for making three-dimensional signage has been known for many years. For example, one conventional process of making three-dimensional signage consists of etching or engraving the desired graphics into a work piece. The graphics would be "raised" or "recessed" depending upon which part of the work piece is engraved or etched away.

This etching or engraving process has many disadvantages. For example, if there is a large amount of material which needs to be removed by the etching or engraving process, this conventional method becomes labor-intensive. Moreover, when large areas of etched or engraved away, cut marks are often visible. This diminishes the overall appearance of the resulting signage.

Another widely used conventional process of producing three-dimensional signage consists of obtaining premade graphics and securing them to a substrate. This two-step process also has several disadvantages. For example, the alignment, spacing and overall appearance of the signage produced by this technique is largely dependent upon the skill of the person securing the graphics onto the substrate. Moreover, since this process is skill dependent, it is also labor-intensive.

The signage industry is continually seeking to discover new and/or improved processes for producing three-dimensional graphics on a work piece. The search for such new and improved process will draw greater attention and interest with the enactment of the Americans with Disability Act (ADA), which became effective in January of 1992. This Act specifies, among other things, certain requirements for signage displayed in public places where finding locations independently on a routine basis may be a necessity.

Regarding lettering, some of the ADA requirements pertaining thereto include: the legibility of the graphics, the character height, and the ratio of the stroke width to the height of the character (see, for example, Federal Register, Vol. 56, No. 144, Rules and Regulations for implementing Title III of the ADA, Section A4.30.2). Moreover, regarding raised and brailled characters and pictorial symbol signs ("pictograms"), some of the ADA requirements pertaining thereto include: standard dimensions for literary braille such as dot diameter, inter-dot spacing, horizontal separation between cells and vertical separation between cells, elevation of characters and pictograms, and border dimension of pictograms (see, for example, Federal Register, supra, Section A4.30.4).

The aforementioned conventional processes can be employed to produce signage which comply with the requirements set out in the ADA. However, due to the inherent disadvantages associated with each of those conventional processes, the time and degree of skill necessary to make such signage will significantly increase. Accordingly, a process which can produce three-dimensional signage without being overly labor-intensive and without having to be largely dependent upon the placement and alignment skill of the artisan will be greatly welcomed by the signage industry. The present invention provides such a process.

One object of this invention is directed to providing novel processes for producing three-dimensional signage which are less labor-intensive and/or skill dependent than conventional processes.

Another object of this invention is directed to providing novel processes for producing three-dimensional signage which complies with the regulations set out in the ADA.

SUMMARY OF THE INVENTION

These and other objects are satisfied by the embodiments of the present invention. Specifically, one embodiment provides a novel process for making raised graphic signage. This embodiment comprises the following steps: (a) obtaining a profile material; (b) obtaining a substrate material; (c) adhering the profile material to the substrate material with an adhesive which bonds firmly enough to hold the profile material and the substrate material together during the process, permits the profile material to be separated from the substrate material after the process is completed, and cures to form a more permanent bond after the profile material is separated from the substrate material; (d) employing a cutting means to cut an outline of a desired graphic completely through the profile material; and (e) separating from the substrate material that portion of the profile material which does not constitute the outlined graphic, before the adhesive forms a permanent bond.

Another embodiment of the present invention provides a novel process for making recessed graphic signage. This embodiment comprises the following steps: (a) obtaining a profile material; (b) obtaining a substrate material; (c) adhering the profile material to the substrate material with an adhesive which bonds firmly enough to hold the profile material and the substrate material together during the process, permits the profile material to be separated from the substrate material after the process is completed, and cures to form a more permanent bond after the profile material is separated from the substrate material; (d) employing a cutting means to cut an outline of a desired graphic completely through the profile material; and (e) separating from the substrate material that portion of the profile material which constitutes the outlined graphic, before the adhesive forms a permanent bond.

When practicing either embodiment of this invention, the alignment and registration of the letters, numbers graphics and/or pictograms are maintained.

Other embodiments, objects, aspects and advantages of the present invention will become apparent to those skilled in the art upon reading the following detailed description when considered in connection with the accompanying drawings and appended claims.

BRIEF DESCRIPTION OF THE DRAWINGS

A more complete appreciation of the invention will be obtained as the same becomes better understood by reference to the following detailed description and the accompanying drawings briefly described below.

DEFINITIONS

Figure 1:
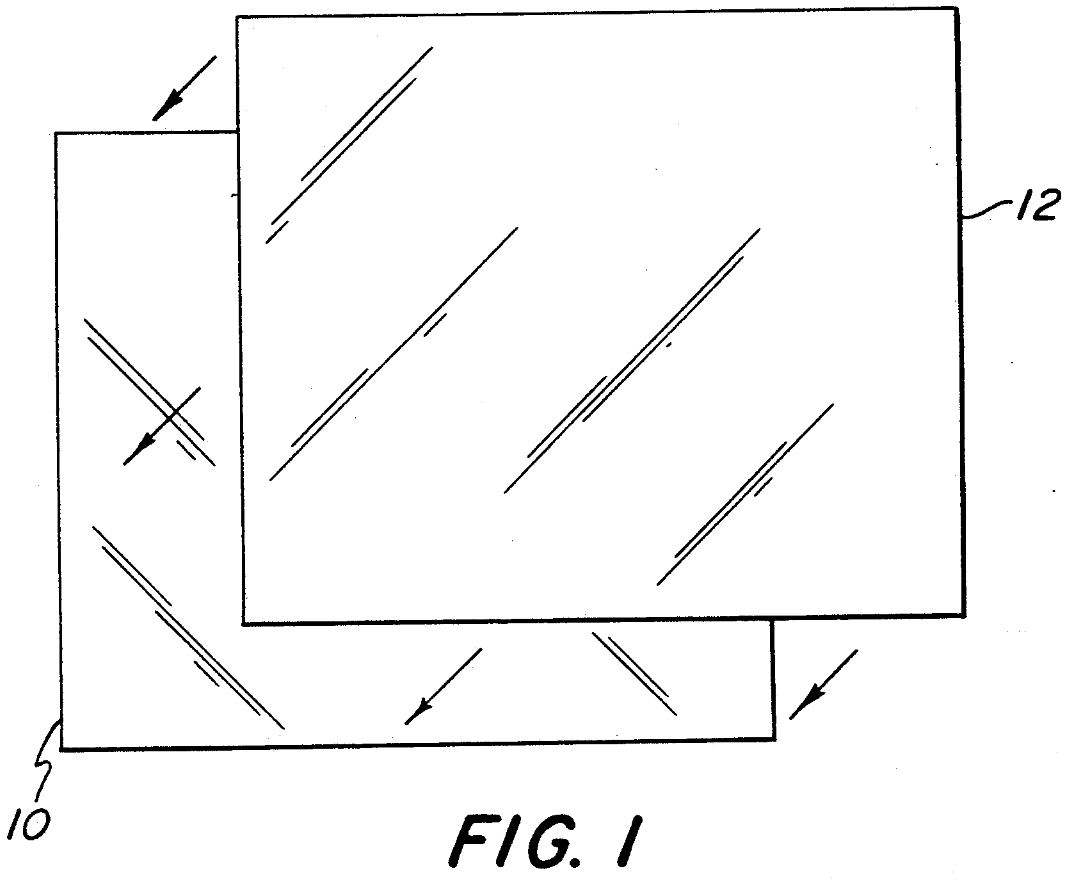
FIG. 1 is an exploded view of a profile material and a substrate material.

As used herein, the term "signage" refers to graphic designs including, without limitation, symbols, emblems, letters, words, and the like used to convey information.

DETAILED DESCRIPTION OF THE INVENTION

This invention pertains to processes for making three-dimensional signage. In particular, these processes can be used to produce three-dimensional letters, numerals, symbols and/or graphics on a work piece.

In one embodiment of this invention, processes are provided for making three-dimensional raised graphic signage. In this embodiment, a profile material is adhered to a substrate material with an adhesive. This adhesive must have the following physical characteristics: (a) it must bond firmly enough to hold the profile and substrate materials together during the process; (b) it must permit the profile and substrate materials to be separated after the process is completed; and (c) it must cure to form a more permanent bond after the profile and substrate materials have been separated from one another.

After the profile and substrate materials are adhered to one another, an outline of a desired graphic is cut completely through the profile material. Then, before the adhesive forms a permanent bond, that portion of the profile material which does not constitute the outlined graphic is separated from the substrate material. The resulting product is a three-dimensional raised graphic signage.

In another embodiment of the present invention, processes are provided for making three-dimensional recessed graphic signage. This latter embodiment is similar to the former with the exception that, after the outline of the desired graphic is cut completely through the profile material, that portion of the profile material which constitutes the outlined graphic is separated from the substrate material, before the adhesive forms a permanent bond.

When practicing the present invention, the profile and/or substrate materials can be any such suitable material known to those skilled in the art. Examples of suitable materials include, without limitation, acrylics, plastics, metals, woods, laminates of sheets of wood, fabric or paper impregnated with synthetic resin and/or any combination thereof. The substrate material can be the same as, different from, the profile material. The preferred profile and/or substrate materials depend, in part, upon the required specifications of the resulting signage.

The profile and/or substrate materials can have any suitable size, shape or thickness. For example, the sizes, shapes and/or thicknesses of these materials may be the same, different, or any combination thereof.

Notwithstanding the above, in most instances, the thicknesses of each of these materials will be less than about 1 inch. Generally, the thickness of these materials will each range from between about 0.002 inch to about 1 inch; more generally from between about 0.004 inch to about 0.5 inch; and even more generally from between about 0.008 inch to about 0.125 inch. To make signage which complies with ADA regulations, the profile material should have a thickness ranging from between about 0.03 inch to about 0.04 inch.

The profile and/or substrate materials can also have any suitable color and finish. For example, the colors and/or finishes of these materials can be the same, different, or any combination thereof.

Not withstanding the above, in order to prepare three-dimensional signage which complies with ADA regulations, an eggshell, matte, or other non-glare finish (i.e., a finish having a degree of gloss ranging from between about 11 to about 19 on a 60 degree glossometer) is recommended. Moreover, the contrast, in percentage, between the colors of the two materials is to be determined by the following equation:

$$\text{Contrast}=[(B_1-B_2)/B_1]\times 100$$

where $B_1$ = light reflectance value of the lighter area, and where $B_2$ = light reflectance value of the darker area.

When preparing three-dimensional raised graphic signage which complies with ADA regulations, it is presently preferred to use a light-colored profile material and a dark-colored substrate material.

After the appropriate profile and substrate materials have been selected, it is necessary to secure these two materials together with an adhesive. The adhesive employed must have the following characteristics: (a) it must bond firmly enough to hold the materials together during the cutting process; (b) it must permit the materials to be separated from one another after the cutting process is completed; and (c) it must cure to form a more permanent bond after the materials have been separated.

Any suitable adhesive which can satisfy the aforementioned requirements can be used. Examples of suitable adhesives include, without limitation, film-type adhesives; foam-type adhesives, acrylic-based adhesives, rubber-based adhesives, vegetable-derived adhesives, animal-derived adhesives, forest-derived adhesives, resins, epoxies, and the like and/or any combination thereof.

The preferred adhesive depends, in part, upon many different variables, such as, the composition of the substrate and/or profile material, the type of cutting means being employed, the time necessary to cut the outline of the desired graphic through the profile material and the environmental conditions to which the signage will be exposed. For example, if the substrate and profile materials are both acrylics, and if the cutting process will be performed within a 15 minute time frame by using a conventional router-type cutter, it is presently preferred to employ an acrylic-based adhesive.

Another preferred feature of the adhesive is that, when the unwanted profile material is separated from the substrate material, a substantial portion of the adhesive is also separated from the substrate material.

The adhesive layer can be placed or spread on either the upper surface of the substrate material, the lower surface of the profile material, or on both. Preferably, when the profile and/or substrate materials are obtained, they already have a layer of the adhesive secured thereto. In this preferred embodiment, the adhesive is generally covered by a protective release coating or film (e.g., paper, plastic, cellulose material, etc.). This prevents extraneous materials from adhering thereto, and forestalls the curing process.

The adhesive layer can be of any suitable thickness which enables it to meet the aforementioned adhesion and curing requirements. However, in most instances, the adhesive layer has a thickness ranging from between about 0.5 mil to about 8 mils; and more preferably, from between about 1 mil to about 6 mils.

Although the time allocated for the adhesive to form a more permanent bond varies with the specific job requirements, in most instances, a suitable adhesive will cure in the time frame from between about 10 seconds to about 8 hours. Generally, most adhesives will cure in a time frame from between about 30 seconds to about 4 hours; more generally, from between about 1 minute to about 2 hours; and even more generally, from between about 5 minutes to about 1 hour.

After the profile and substrate materials have been secured to one another with a properly selected adhesive, a cutting means is employed to cut an outline of the desired graphic. This outline is cut completely through the profile material. Preferably, this cut also goes through the adhesive layer. More preferably, this cut even goes slightly into the upper surface of the substrate material.

Any suitable cutting means, such as a rotary cutting bit, can be employed when practicing this invention. The preferred cutting means will depend, in part, upon the composition and/or thickness of the selected profile material.

When cutting the outline of the desired graphic design, there is generally no limitation as to character size and/or proportion. However, to satisfy ADA regulations, the raised letters and numbers must have a height ranging from between about 0.6 inch to about 2 inches. Moreover, the border dimensions of any pictograms must be at least 6 inches high.

In addition to the above, ADA regulations require that the width-to-height ratio of the letters and numbers must range from between about 0:1.5 to about 1:1. Also, their stroke width-to-height ratio must range from between about 1:5 to about 1:10.

The cutting step of the present invention can be controlled either manually, electronically (e.g., through an interface with a computer software program), and/or a combination thereof. The preferred method of control will depend, in part, on the required parameters of the final product and the resources available to the artisan.

When the present invention is employed to produce three-dimensional raised graphic signage, after an outline of the desired graphic has been cut through the profile material, and before the adhesive forms a permanent bond, that portion of the profile material which does not constitute the outlined graphic is separated from the substrate material. This leaves the outlined graphic still adhered to the substrate material.

On the other hand, when the present invention is employed to produce three-dimensional recessed graphic signage, after an outline of the desired graphic has been cut through the profile material, and before the adhesive forms a permanent bond, that portion of the profile material which constitutes the outlined graphic is separated from the substrate material. This leaves a void in the profile material in the shape of the outlined graphic.

It is also within the purview of this invention to employ multiple layers of profile materials. Each layer can have a different color, finish, thickness and/or composition from the other profile material(s) and/or from the substrate material. By employing such multiple layers, three-dimensional signage can be made having both recessed and raised graphics.

It is further within the purview of this invention to employ a cutting process which includes an engraving process. Here, a three-dimensional graphic is engraved partway into the profile material. An outline is then cut around the engraved graphic. The cut forming this outline goes completely through the profile material. This cutting/engraving process is especially useful in the production of raised graphic signage when the individual raised graphics do not have enough adhesive area to produce a permanent bond (e.g., during the production of brailled graphics).

This invention will be more fully understood from the following example. This example is only intended to demonstrate selective embodiments of the invention and is not intended to limit the scope thereof.

EXAMPLE

This example demonstrates a process for preparing three-dimensional graphic signage. For illustrative purposes, this example will refer to FIGS. 1-7. A commercially available acrylic substrate material 10 and a commercially available acrylic profile material 12 were obtained. Substrate material 10 had a thickness of about 0.063 inch; and profile material 12 had a thickness of about 0.031 inch.

A permanent acrylic pressure sensitive adhesive 14 was secured to the lower surface of profile material 12. That portion of adhesive 14 which was not secured to the lower surface of profile material 12 was covered with a removable protective liner.

Adhesive 14 had a thickness of about 2.0 mils. Adhesive 14 is commercially available from Dielectric Polymers, Inc. (Model No.: NT100AP) and 3M Corporation (Model Nos.: 467MS and 467MP).

Cutting was performed by an electric router fitted with a rotating cutting bit. After the cutting tool was calibrated for the thickness of the profile material, the protective liner was removed from the adhesive layer. Immediately thereafter, the lower surface of profile material 12 was pressed against the upper surface of substrate material 10 in a manner similar to that illustrated in FIG. 1.

Figure 2:
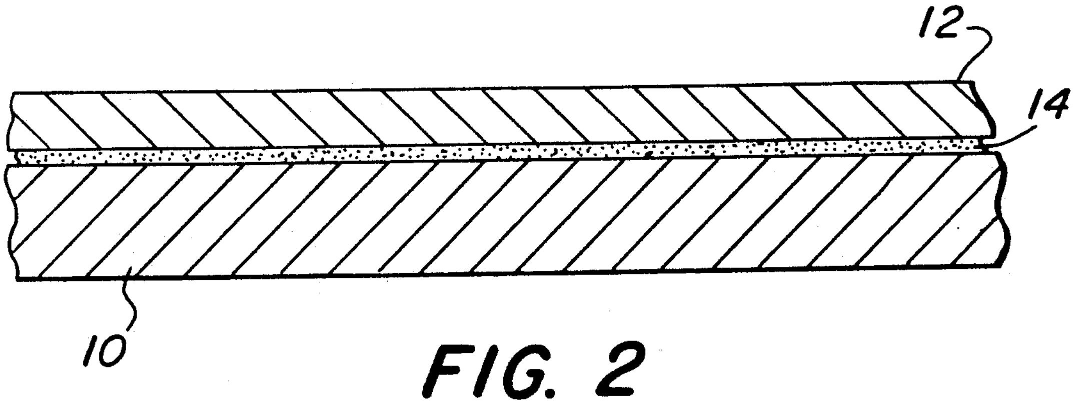
FIG. 2 is an enlarge cross-sectional view of a profile material adhered to a substrate material (not necessarily to scale).
Figure 3:
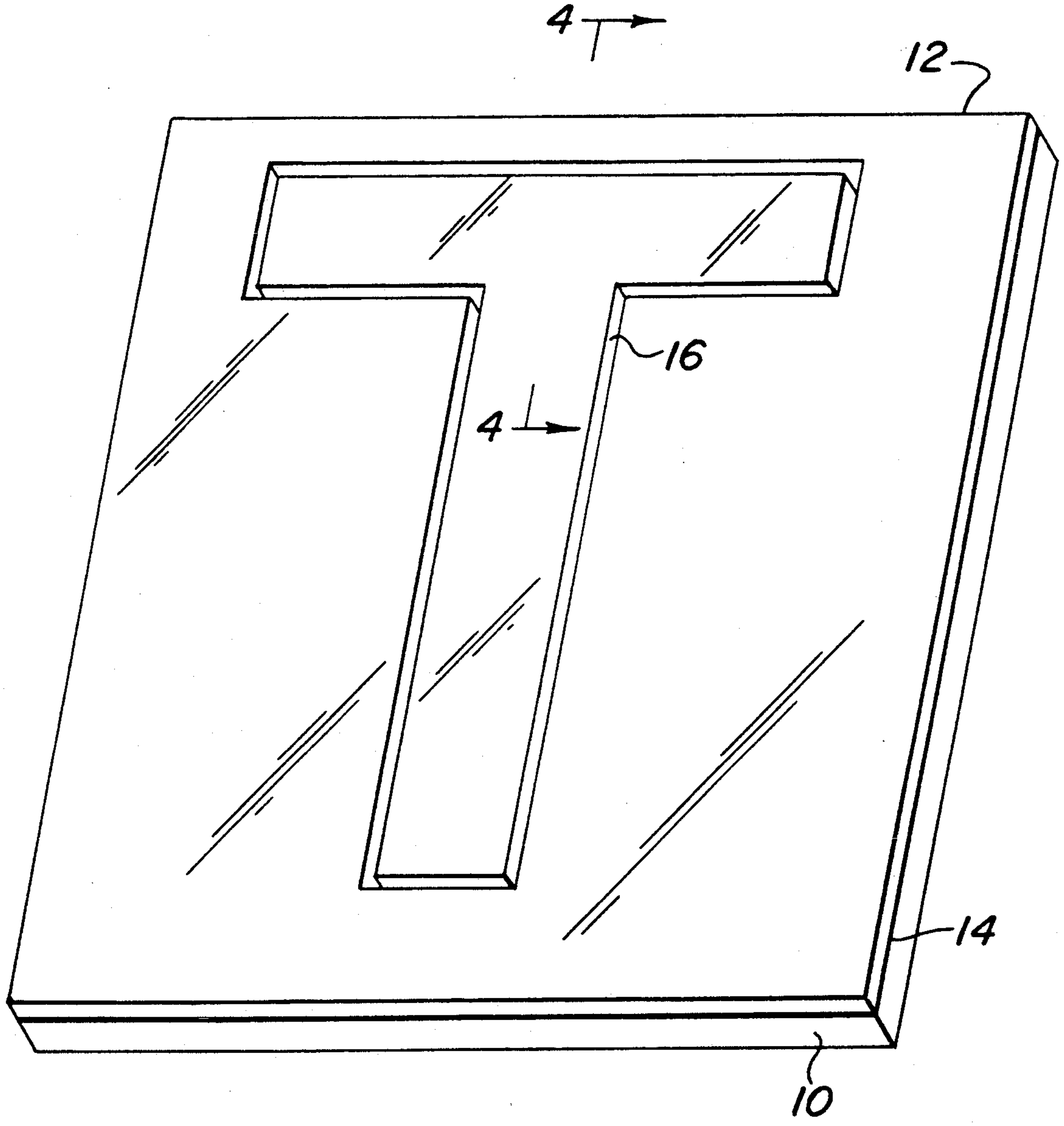
FIG. 3 is an isometric view of a profile material and a substrate material after the outline of a desired graphic has been cut completely through the profile material.
Figure 4:
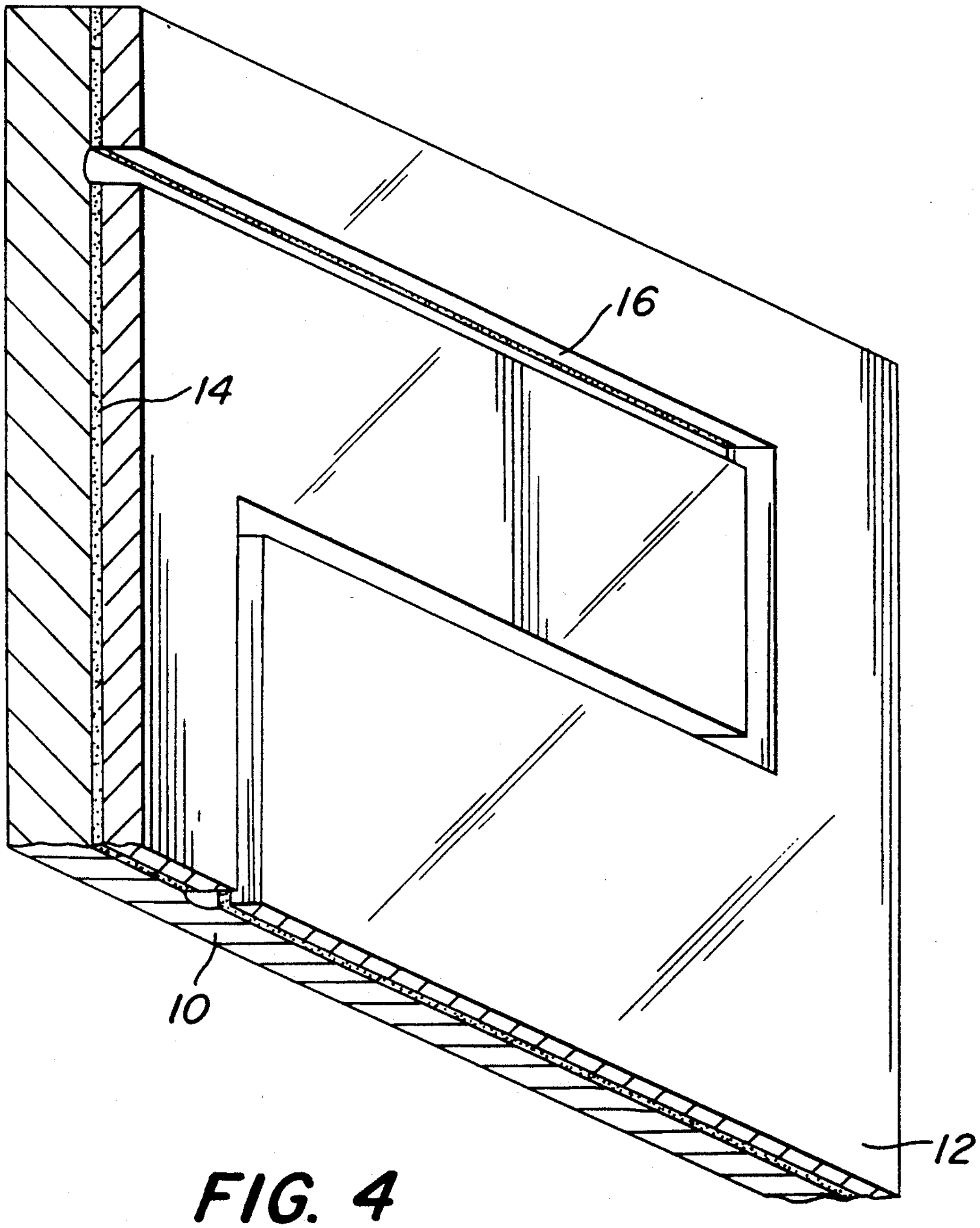
FIG. 4 is a cross-sectional view of the profile material adhered to the substrate material taken alone line 4—4 of FIG. 3.

FIG. 2 illustrates an enlarged cross-sectional illustration of profile material 12 adhered to substrate material 10. The relative dimensions and thicknesses in this FIGURE are not necessarily to scale.

Immediately after the profile and substrate materials were secured together, the outline of the desired graphic was cut using the router. The cutting was done completely through both profile material 12 and adhesive layer 14. This cut also went slightly into the upper surface of substrate material 10.

For illustration purposes, the graphic design cut through profile material 12 in FIGS. 3-7, is that of the letter "T". Moreover, in FIGS. 3 and 4, the groove resulting from the cutting process is identified by item number 16.

After the cutting process was completed, but before the adhesive formed a permanent bond, the unwanted portion of profile material 12 was separated from substrate material 10. The time frame between adhering the profile and substrate materials together and separating the two after the cutting process was approximately 10 minutes.

Figure 5:
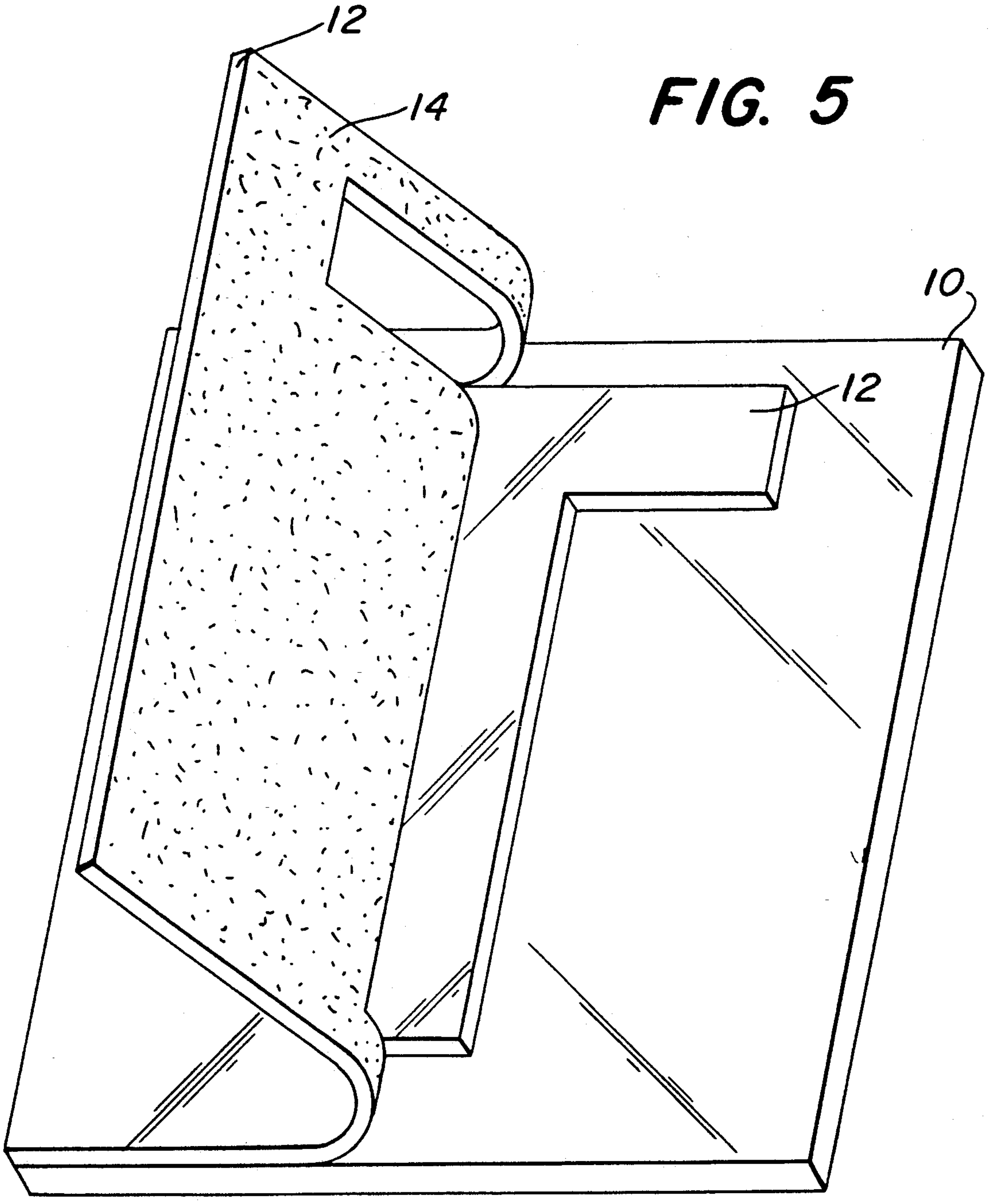
FIG. 5 is an isometric view illustrating the separation of the profile material from the substrate material after the outline of the desired graphic has been cut completely through the profile material but before the adhesive forms a permanent bond.
Figure 6:
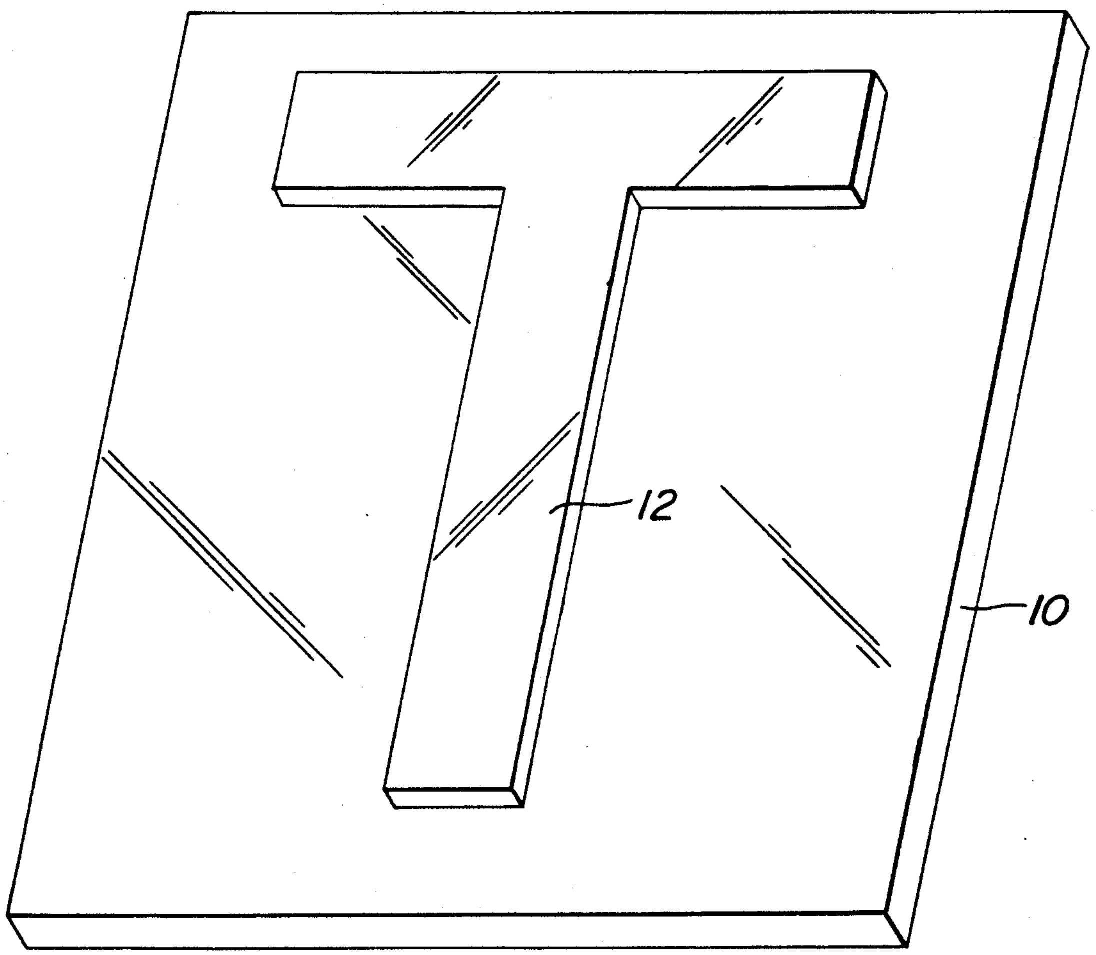
FIG. 6 is an isometric view of a three-dimensional raised graphic signage made in accordance with this invention.
Figure 7:
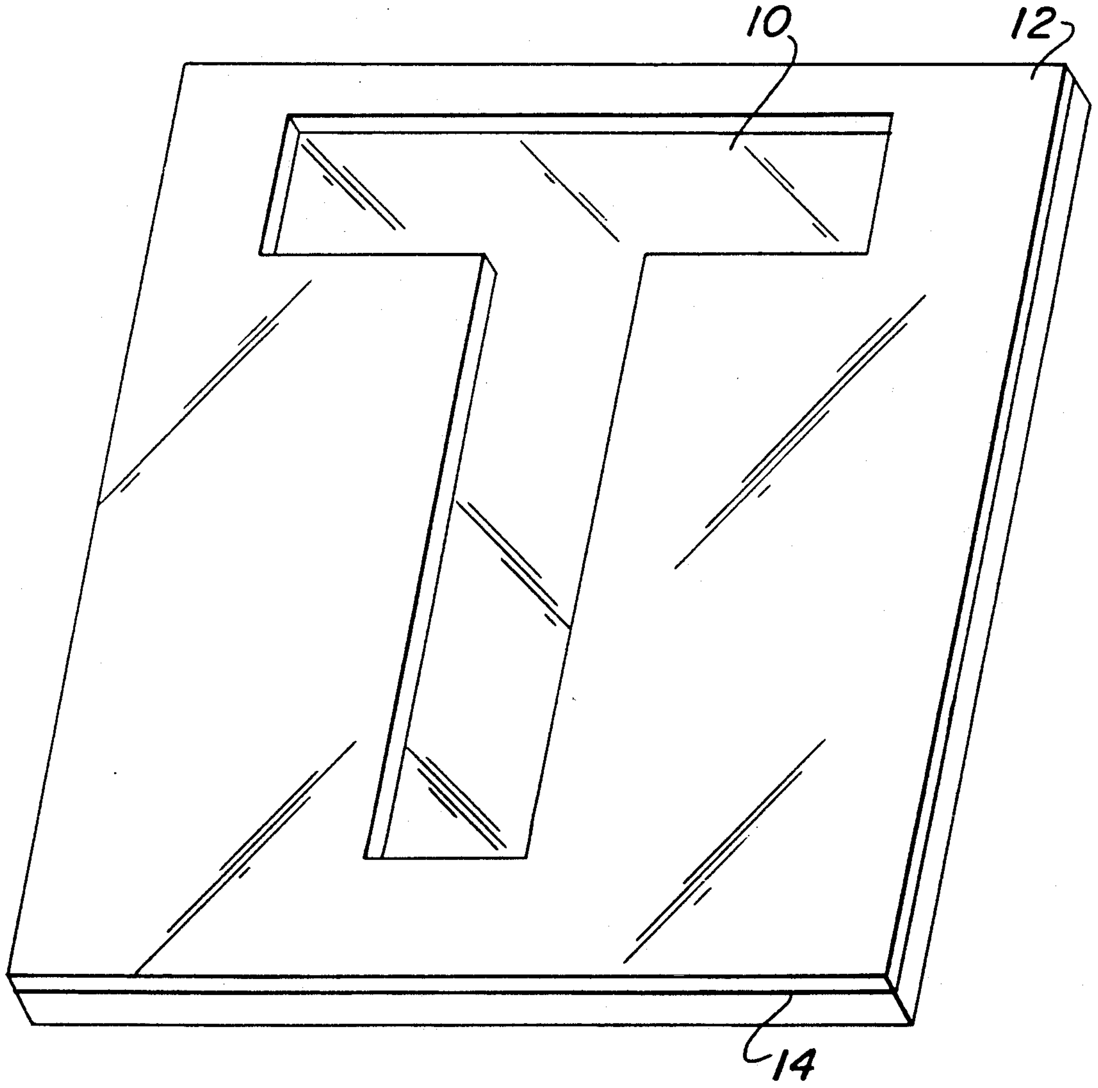
FIG. 7 is an isometric view of a three-dimensional recessed graphic signage made in accordance with this invention.

FIG. 5 demonstrates one method of separating profile material 12 from substrate material 10 in order to produce a raised graphic signage. Specifically, by peeling away that portion of profile material 12 which outlined the letter "T", a raised graphic signage is formed. The resulting signage would be similar to that illustrated in FIG. 6.

On the other hand, if that portion of profile material 12 which constituted the letter "T" is separated from substrate material 10, a recessed graphic signage would be formed. This signage is similar to that illustrated in FIG. 7.

It is evident from the foregoing that various modifications can be made to the embodiments of this invention without departing from the spirit and/or scope thereof which would be apparent to those skilled in the art.

Having thus described the invention, it is claimed as follows:

1. A process for making a three-dimensional graphic signage consisting of the following steps:

(a) obtaining a profile material;

(b) obtaining a substrate material;

(c) adhering the profile material to the substrate material with an adhesive layer, said adhesive layer:

(i) bonds firmly enough to hold the profile material and the substrate material together during a process step wherein an outline of a graphic design is cut completely through said profile material and said adhesive layer but not completely through said substrate material, (ii) permits the profile material to be separated from the substrate material after said cutting process step is completed, and (iii) cures to form a permanent bond after the profile material is separated from the substrate material;

(d) employing a cutting means to cut an outline of at least one graphic design completely through the profile material and said adhesive layer while said profile material is adhered to said substrate material, said cutting means does not make a cut which goes completely through said substrate material; and (e) before the adhesive layer forms a permanent bond, separating from the substrate at least a portion of the profile material which:

(i) does not constitute the outlined graphic design; or (ii) constitutes the outlined graphic design.

2. A process as recited in claim 1 wherein the profile material, the substrate material, or both comprise at least one material selected from the group consisting of: acrylics, plastics, metals, woods, laminates, sheets of wood, fabric or paper impregnated with synthetic resin and any combination thereof.

3. A process as recited in claim 1 wherein the profile material, the substrate material, or both are comprised of acrylics.

4. A process as recited in claim 1 wherein the profile material, the substrate material, or both have a thickness which is less than about 1 inch.

5. A process as recited in claim 4 wherein the profile material, the substrate material, or both have a thickness ranges from between about 0.02 inch to about 1 inch.

6. A process as recited in claim 1 wherein the profile material, the substrate material, or both have a finish with a degree of gloss ranging from between about 11 to about 19 on a 60 degree glossometer.

7. A process as recited in claim 1 wherein the contrast between the profile material and the substrate material is determined by the following equation:

$$Contrast=[(B_1-B_2)/B_1]\times 100$$

where $B_1$ = light reflectance value of the lighter area, and where $B_2$ = light reflectance value of the darker area.

8. A process as recited in claim 1 wherein the adhesive layer comprises a composition selected from the group consisting of: film-type adhesives, foam-type adhesives, acrylic-based adhesives, rubber-based adhesives, vegetable-derived adhesives, animal-derived adhesives, forced-derived adhesives, resins, epoxies, and any combination thereof.

9. A process as recited in claim 1 wherein the adhesive layer comprises an acrylic-based adhesive.

10. A process as recited in claim 1 wherein the adhesive layer is secured to the upper surface of the substrate material, the lower surface of the profile material, or both, and wherein the adhesive layer is covered by a protective release coating or film which prevents extraneous materials from adhering thereto.

11. A process as recited in claim 1 wherein the adhesive layer has a thickness ranging from between about 0.1 mil to about 10 mils.

12. A process as recited in claim 1 wherein the adhesive layer cures to form a more permanent bond within the time frame ranging from between about 10 seconds to about 8 hours.

13. A process as recited in claim 1 wherein the cutting means is controlled either manually, electronically, or a combination of both.

14. A process as recited in claim 1 wherein a plurality of profile materials are adhered to the substrate material.

* * * * *